United States Patent

Hagerman

Patent Number: 5,247,151
Date of Patent: Sep. 21, 1993

[54] MOLD MAKING PROCESS

[76] Inventor: Johnny E. Hagerman, 3516 Saddleboro Dr., Uniontown, Ohio 44685

[21] Appl. No.: 828,783

[22] Filed: Jan. 30, 1992

[51] Int. Cl.⁵ .............................................. B23H 9/00
[52] U.S. Cl. .................................. 219/69.17; 425/28.1
[58] Field of Search ............... 219/69.17, 69.15, 69.16, 219/69.2; 425/28.1; 409/902

[56] References Cited

U.S. PATENT DOCUMENTS

| | | | |
|---|---|---|---|
| 1,339,816 | 5/1920 | Fiddyment | 409/902 |
| 3,694,610 | 9/1972 | Saito et al. | 219/69.17 |
| 4,145,955 | 3/1979 | Mueller et al. | 409/902 |
| 4,409,457 | 10/1983 | Takahashi et al. | 219/69.17 |
| 4,471,200 | 9/1984 | Takahashi et al. | 219/69.17 |
| 4,543,050 | 9/1985 | Takahashi et al. | 425/28.1 |
| 4,576,559 | 3/1986 | Yoda et al. | |
| 4,589,072 | 5/1986 | Arimatsu | |
| 4,708,609 | 11/1987 | Yoda et al. | |

FOREIGN PATENT DOCUMENTS

| | | | |
|---|---|---|---|
| 56-27742 | 3/1981 | Japan | 219/69.17 |
| 59-161229 | 9/1984 | Japan | 219/69.17 |
| 1546218 | 2/1990 | U.S.S.R. | 219/69.17 |

OTHER PUBLICATIONS

"Sink The Unthinkable" Flyer, Mitsubishi International Corporation, EDM Division.

Primary Examiner—Geoffrey S. Evans
Attorney, Agent, or Firm—Renner, Kenner, Greive, Bobak, Taylor & Weber

[57] ABSTRACT

A process for making from a mold segment blank (11) a metal tire mold (10) having a tread contour surface (15) corresponding to the outer circumference of a tire to be molded and having a plurality of finished projections (16, 17) on the tire tread contour surface having sides oriented substantially normal to the tire tread contour thereat, comprising the steps of generating a three-dimensional representation of the tread contour surface and the finished projections, machining an electrode (35) for electric discharge machining apparatus having slots (42, 43) of greater dimensions than the finished projections for forming initial projections of greater dimensions than the finished projections, mounting the electrode and the mold segment blank in the electric discharge machining apparatus, generating an electric discharge between the electrode and the mold segment blank, effecting relative motion between the electrode and the mold segment blank substantially radially of the mold segment blank for forming the initial projections, and relatively orbiting the electrode and the mold segment blank for bringing the initial projections to the orientation and configuration of the finished projections and effecting finishing on the surfaces thereof.

20 Claims, 6 Drawing Sheets

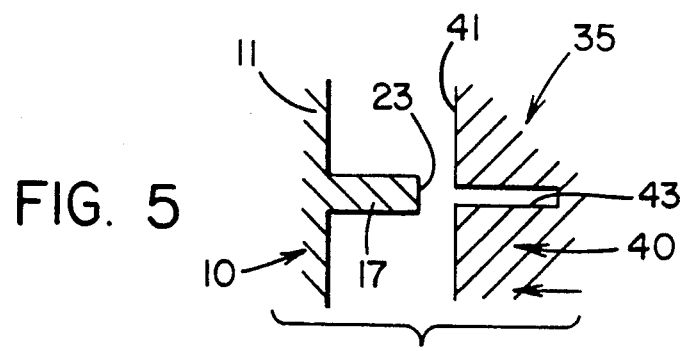
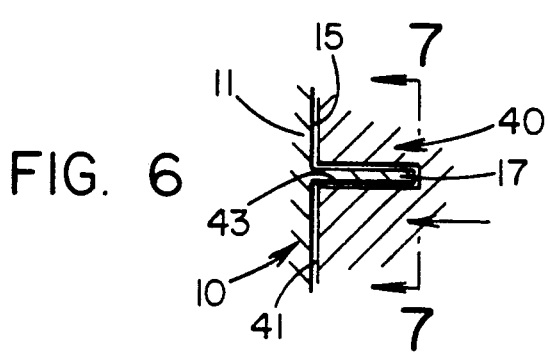
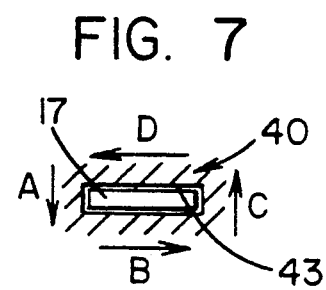
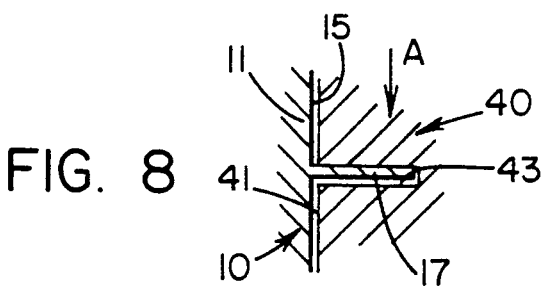
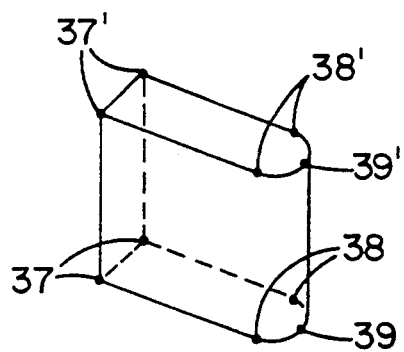
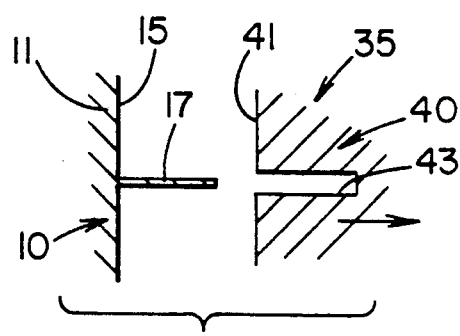

FIG. IIB
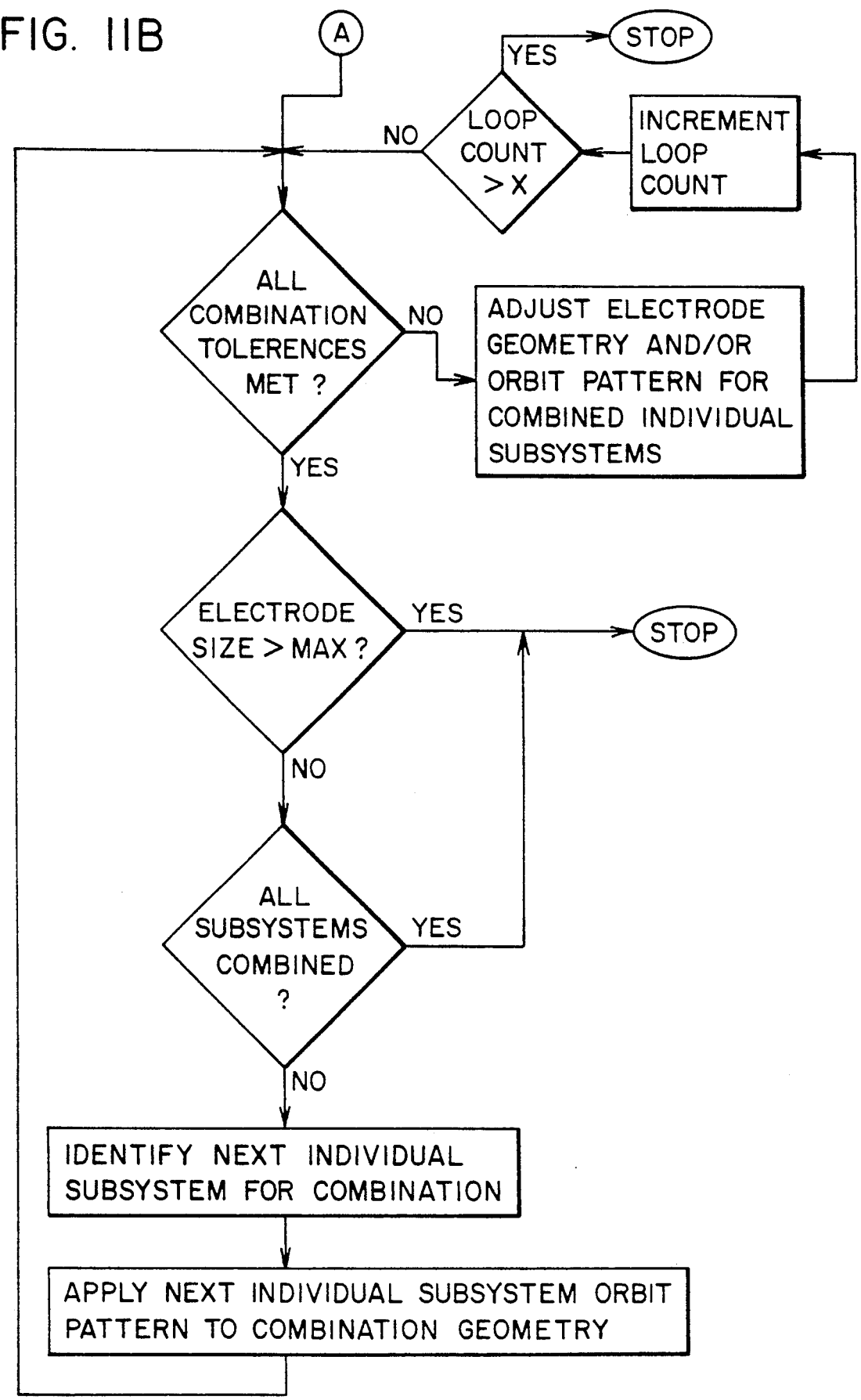

MOLD MAKING PROCESS

TECHNICAL FIELD

Generally, the invention relates to a method for making precise metal molds for products. More particularly, the invention relates to a method for making precise metal molds for products having complex geometric configurations. More specifically, the invention relates to a method for making close tolerance metal molds having intricate patterns formed on combinations of complex geometric surfaces by employing electric discharge machining.

BACKGROUND ART

It has long been recognized as a difficult and expensive proposition to produce molds for products having complex geometric configurations. The problems are compounded when the configurations must be formed on surfaces which are of complex geometry or constitute combinations of complex geometric areas. Molds for the shaping and curing of pneumatic tires are a classic example in that they are of a generally toroidal configuration having a pair of interior surfaces defining the sidewalls of a tire, which are spaced and joined by a tread portion of the mold. While a tire tread is circular in a direction circumferentially thereof, the tire tread normally has a plurality of areas of different curvature in a direction laterally or axially of the tire tread.

Tire treads have multiple projections which form what are commonly referred to as grooves and sipes that are normally in circumferential, repeating patterns about the entire periphery of the tread. The arrangement of the grooves and sipes is material to the traction, water removal, noise and other characteristics of a tire. There are an infinite number of possible arrangements of grooves and sipes on a tire which may be employed to achieve desired operating characteristics for particular tire designs. Many thousands of tire tread configurations have been employed by tire manufactures over the years. While the arrangement, depth, and size of grooves and sipes in tire treads are subject to infinite variation, they do share the common trait that the sides thereof are disposed substantially normal to the curved surface of the tire tread at their location thereon so that the grooves and sipes are substantially perpendicular to the ground surface when that portion of the tire tread comes in contact with the ground.

In order to achieve this final configuration of the completed tire, the tire molds have projecting ribs that form the grooves in the tread and sipe blades which form the sipes in the tread. In order to achieve the desired orientation of the grooves and sipes, the ribs and sipe blades must be perpendicular to the tread contour surface on the mold which forms the outer tread surface of the tire. Since the contour surface of a mold is of complex curvature in that there is a uniform curvature circumferentially of the tire and variable curvature laterally thereof, it becomes a complex three-dimensional, geometric problem to construct a tire mold having the sides of the ribs and sipe blades perpendicular to the tread contour surface at substantially all points thereon. In some instances, it is intentionally desired that the side of the ribs or sipe blades be at an angle to the contour surface to achieve what is termed a draft angle, which further complicates the already complex mold forming processes that are employed in the art.

In order to achieve even an acceptable degree of precision in tire molds, it has historically been necessary to employ highly complex molding processes. At various times, tire molds have been made employing plaster molding, sand casting, ceramic casting, metal mold casting, and other precision casting processes. Due to the number of steps and inherent irregularities and variations, the aluminum molds normally produced in this manner lack precision and commonly exhibit defects despite the very high manufacturing costs attendant such multi-step molding processes. In other instances, engraving processes have been employed to make tire molds of materials which are harder and more durable than aluminum, such as steel. In many instances, it has nonetheless been desirable or necessary to provide detachable or permanently attached inserts to form the ribs and sipe blades which project inwardly from the tread contour surface of the mold. The use of such inserts, however, creates the possibility of tire tread rubber being forced between the tread contour surface and the insert during shaping and curing of uncured tires to produce a burr or defect in the finished tire. In other instances, it has become common to make sipe blades as a separate element and insert them in grooves formed in the tread contour surface. This, however, requires an additional labor-intensive step and produces a mold wherein the sipe blades may be loosened or dislodged after a period of usage, thus creating significant mold servicing or rebuilding expenses and a loss of operating time for the mold.

More recently, substantial interest has developed in the making of tire molds employing electrical discharge machining techniques because the molds may be made of hardened steel, with the attendant advantages of durability, longevity, and the limited need for servicing or rebuilding. In some instances, efforts have been made to electric discharge machine inserts which are positioned in a tread contour surface. However, this approach is subject to the longstanding problem that such inserts may be damaged, become loosened, create defects as described above, or move sufficiently such that the accuracy of the mold is affected.

In order to avoid these disadvantages, efforts have been made to electric discharge machine tire molds from integral parent material such as to avoid the disadvantages of inserts of any type. These efforts have encountered the problems that in endeavoring to form the ribs and sipe blades having the normally intricate patterns, it is necessary that multiple burning operations be undertaken with different approach angles, and in some instances different tooling, in order to achieve sufficient precision of the sides of the sipe blades and ribs without the incidental removal of material constituting required portions of the sipe blade or rib elements. The necessity of multiple electric discharge machining stages and/or a plurality of burns per stage, often with different electrode configurations, has resulted in processes which are of sufficient duration and require a sufficient number of different electrode configurations such as to make the process excessively expensive and frequently applicable to only a limited number of geometric configurations of the sipe blades and ribs.

Thus, none of the known processes for the making of tire molds have solved the various problems attendant the various processes as described above at less than an extremely high cost while achieving accuracy which remains below tire industry goals. The criticality of these problems has been intensified by the fact that tire manufactures have come to realize the importance of highly accurate mold dimensions because such accuracy is highly significant in terms of improved performance and wear achieved by the resultant tires.

DISCLOSURE OF THE INVENTION

Therefore, an object of the present invention is to provide a process for making a metal tire mold which has extremely close dimensional accuracy as to the overall tire dimensions and the dimensions of the tread elements such that precision tires may be repeatedly produced with a minimum of flash. Another object of the present invention is to provide a process for making such a mold wherein the entire tread area of the mold is of integral or parent material, i.e., without inserts, whereby the aforedescribed disadvantages of a mold with inserts is avoided such that even long-term maintenance of the mold is minimized. A further object of the present invention is to provide a process for making tire molds employing an electric discharge machining process whereby the mold may be made of hardened steel to improve mold life, or even from stainless steel to deter corrosion and pitting of the mold cavity surfaces which otherwise results from electrolysis.

Another object of the present invention is to provide a process for making a metal tire mold employing electric discharge machining wherein segments of the mold tread segment blanks may be cut by identical electrodes in a single-stage machining operation. Another object of the present invention is to provide such a process wherein the segments of the mold tread segment blanks extend the entire axial dimension of the tread contour surface of the mold tread segment blanks, i.e., from shoulder to shoulder of the tire to be molded, to maintain highly accurate dimensions in the shoulder-to-shoulder dimension of the tire and the axial placement of the tread projections thereon. Still another object of the present invention is to provide such a process wherein the electrodes may be of conventional carbon construction and are of varying dimensions circumferentially of the mold tread segment blanks, depending upon the configuration and arrangement of the projections required for a particular tread configuration. Yet another object of the invention is to provide such a process wherein the projections formed in the mold tread segment blanks may be made with sufficient precision such that the completed tire mold does not require hand-finishing work. Still a further object of the present invention is to provide such a process wherein the projections of the tread contour surface are initially cut directly axially of the tire tread contour surface to greater dimensions than the finished projections, and subsequent relative orbiting of the electrode and the segment of the tire tread contour surface bring the projections to the orientation and configuration of the finished projections and effects finishing on all surfaces of the projections.

Another object of the present invention is to provide a process for making a metal tire mold wherein the electrode for the electric discharge machining can be machined on conventional milling machines using standard milling cutters. Yet a further object of the present invention is to provide such a process wherein flush holes may be provided in the electrode such that residue in the electrode and the mold tread segment blanks may be washed away by dielectric fluid, coupled with intermittent retraction and repositioning of the electrode during the burning operation, to enhance the removal of residue that can create arcing and excessive overburn of the surface of the mold tread segment blanks. Yet another object of the invention is to provide such a process wherein worn electrodes may be employed, if desired, to effect the initial cut to depth of the mold segment blanks radially thereof for forming the initial projections, while employing a new or relatively non-worn electrode for the orbiting operation.

Another object of the present invention is to provide a process for making a metal tire mold which includes determining the size and configuration of the electrodes employed to cut and finish the tire engaging surface of the mold tread segments. Yet a further object of the invention is to provide a systematic process for determining an electrode geometry and orbiting pattern to form mold tread segments for a particular tire tread pattern. Still another object of the invention is to provide such a process that maximizes the resultant tread area which can be encompassed by a single electrode while maintaining the tolerances and surface finish of the geometries in the tread area. A further object of the invention is to provide such a process which contemplates the calculation of electrode geometry and orbit pattern for a plurality of individual subsystems in a tread area, the combination of a plurality of such individual subsystems, and the readjustment of electrode geometry and orbit pattern until the resulting surface geometries of each subsystem of the combined subsystems is within acceptable tolerances. Yet another object of the invention is to provide such a process wherein the order in which individual subsystems are incorporated into combined subsystems is subject to a number of preferences which involve characteristics such as the relative locations of the subsystems in the tread pattern, the nature and configuration of the geometric elements making up the individual subsystems, and relative tolerance of the geometric elements of the individual subsystems to modifications in electrode geometry and orbit pattern.

A further object of the present invention is to provide a process for making a metal tire mold which, while exceeding the dimensional accuracy of molds currently employed in the industry, permits the mold to be constructed at a competitive price due to the employment of a process which is largely automated such as to greatly reduce the normal labor costs for the fabrication of a tire mold. Still a further object of the present invention is to provide such a process which is particularly adapted to the construction of segmented molds but may be employed in conjunction with the production of two-piece molds. Yet a further object of the present invention is to provide such a process wherein precise repetition from machining operation to machining operation, from mold tread segment to mold tread segment, and from tire mold to tire mold can be readily achieved. Still another object of the present invention is to provide such a process in which the mold tread segment blanks, the electrodes, and the machining of the mold tread segment blanks can all be accomplished on equipment which is commercially available.

In general, the present invention contemplates a process for making from a mold segment blank a metal tire mold having a tread contour surface corresponding to the outer circumference of a tire to be molded and having a plurality of finished projections on the tire tread contour surface having sides oriented substantially normal to the tire tread contour thereat, including the steps of generating a three-dimensional representation of the tread contour surface and the finished projections, machining an electrode for electric discharge machining apparatus having slots of greater dimensions than the finished projections, for forming initial projections of greater dimensions than the finished projections, mounting the electrode and the mold segment blank in the electric discharge machining apparatus, generating an electric discharge between the electrode and the mold segment blank, effecting relative motion between the electrode and the mold segment blank substantially radially of the mold segment blank for forming the initial projections, and relatively orbiting the electrode and the mold segment blank for bringing the initial projections to the orientation and configuration of the finished projections and effecting finishing on the surfaces thereof.

BRIEF DESCRIPTION OF THE DRAWINGS

FIG. 4 is an orthogonal projection of a wire frame model for a rib having planar side surfaces and a smooth arcuate end.

FIG. 5 is a schematic fragmentary sectional depiction of a portion of a tread segment blank into which a sipe blade is to be cut and a portion of a carbon electrode having a slot for encompassing the sipe blade, said blade and said electrode being shown in proximity as they might be mounted in electric discharge machining apparatus.

FIG. 6 is a schematic fragmentary sectional depiction similar to and sequential to FIG. 5 showing the position of the electrode and the remainder of the tread segment blank after the relative motion therebetween radially of the blank in the direction of the arrow in FIG. 5 to effect machining of blank material proximately surrounding the sipe blade and leaving the sipe blade positioned in the slot of the electrode.

FIG. 7 is a top sectional view taken substantially along line 7—7 of FIG. 6 showing a partially machined sipe blade within a sipe blade slot and indicating sequential relative movement therebetween in a rectangular orbit pattern as represented by the arrows labeled A, B, C, and D.

FIG. 8 is a schematic fragmentary sectional depiction similar to and sequential to FIG. 6 showing orbital displacement in the direction of the arrow between the electrode and the blank by moving one wall of the slot into proximity with one side of the sipe blade to bring the one side to dimensional tolerances and effect surface finishing thereof.

FIG. 9 is a schematic fragmentary sectional depiction similar to and sequential to FIG. 8 showing further orbital displacement in the direction of the arrow between the electrode and the blank by moving the other wall of the slot into proximity with the other side of the sipe blade to bring the other side to dimensional tolerances and effect surface finishing thereof.

FIG. 10 is a schematic fragmentary sectional depiction similar to and sequential to FIG. 9 showing the completed sipe blade removed from the electrode slot after relative motion between the carbon electrode block and the machined portion of the tread segment blank radially of the tread segment in the direction of the arrow.

FIG. 11B is the continuation and completion of the top level flow chart begun in FIG. 11A.

PREFERRED EMBODIMENT FOR CARRYING OUT THE INVENTION

Figure 1:
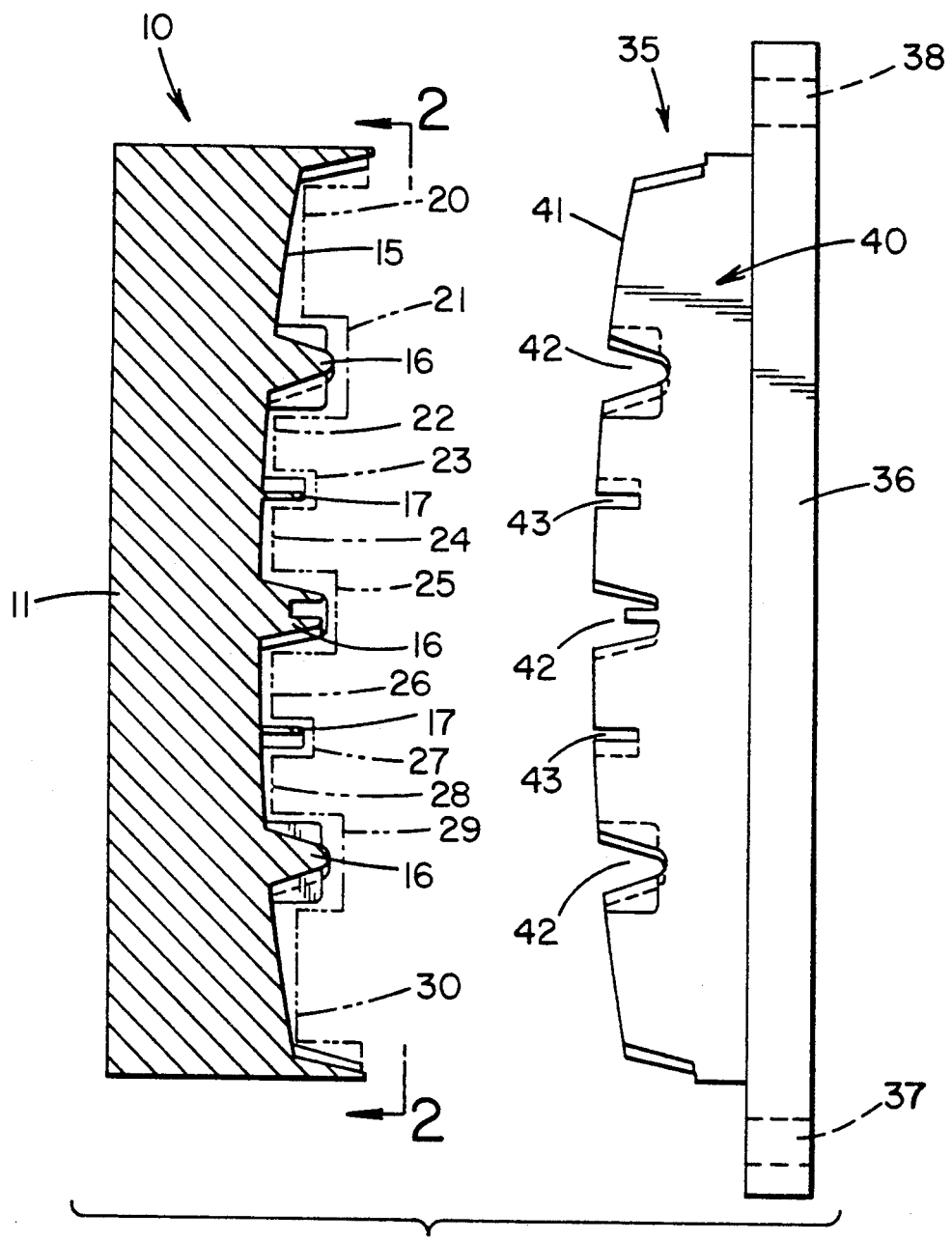
FIG. 1 is a view partially in elevation and partially in section showing an exemplary tread segment of a segmented mold and an electrode made according to the concepts of the present invention for the manufacture of vehicle tires.
Figure 2:
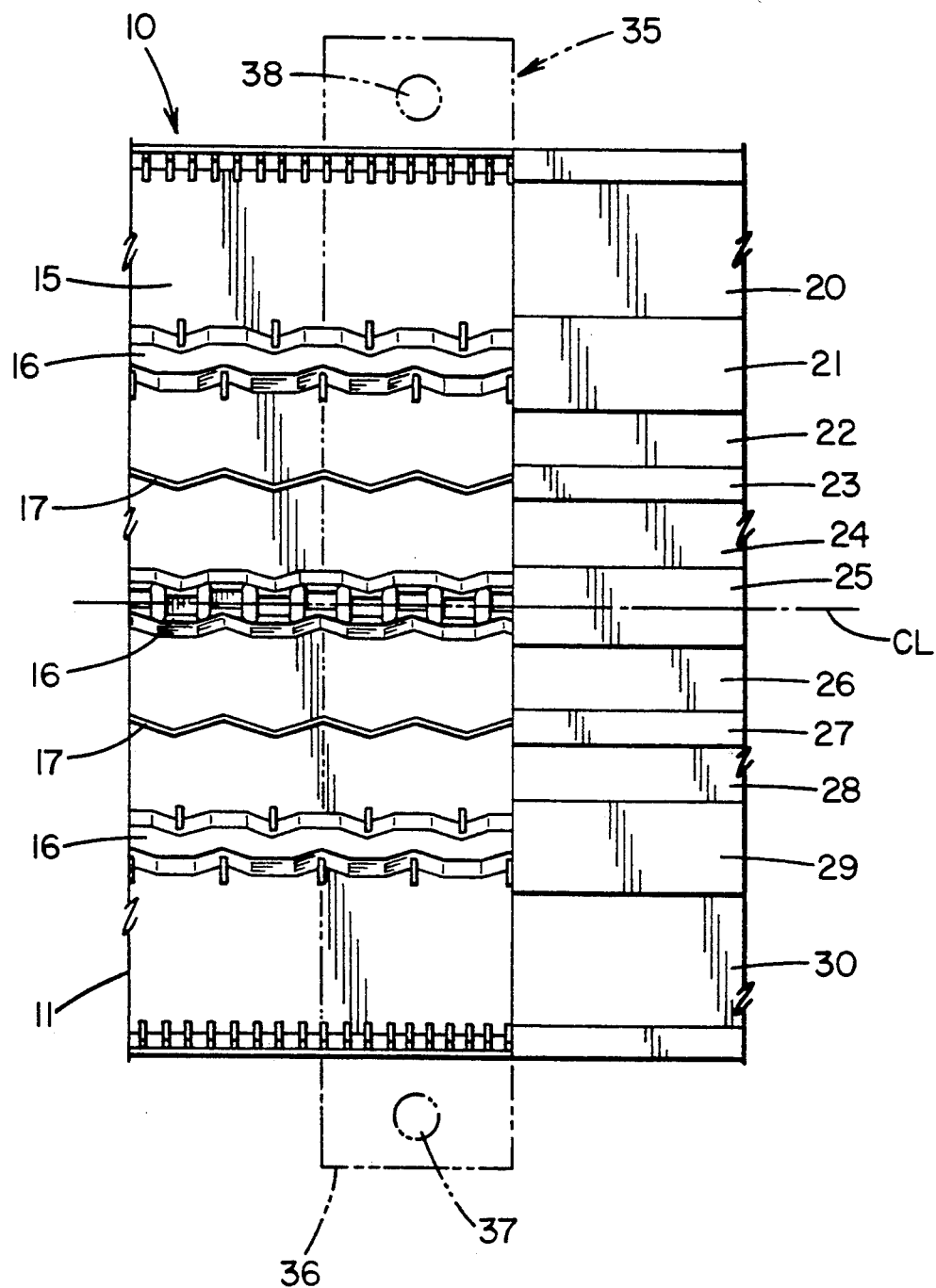
FIG. 2 is a fragmentary plan view of a portion of the tread segment of the segmented mold of FIG. 1, taken substantially along the line 2—2 of FIG. 1 and showing a portion which has been machined by an electrode, a portion in a position to be machined by the electrode shown in chain lines, and a portion which has not been machined by the electrode.

A portion of an exemplary tire curing mold made according to the process of the present invention is generally indicated by the numeral 10 in FIGS. 1 and 2 of the drawings. As depicted, the portion of mold 10 shown is a fragmentary part of one tread segment 11 of a segmented mold. As will be appreciated by persons skilled in the art, a conventional segmented mold consists of a pair of sidewall section (not shown), which are spaced and joined by a plurality of tread segments such as the tread segment 11. Normally, tread segments encompass approximately a 45° arc with eight such segments being employed to constitute the full circumferential extent of the tread portion of a segmented mold. As shown, the tread segment 11 has a lateral or axial dimension which extends from shoulder to shoulder of a pneumatic tire to be molded in the mold 10. While the process of the present invention is particularly well adapted to and described in conjunction with segmented molds, the operations of the present invention may be adapted for use in connection with the manufacture of two-piece molds.

The tread segment 11 has a tread contour surface 15 which forms the outer circumferential portion or tread surface of a pneumatic tire. The tread surface of a tire characteristically has depressions which provide gripping, water removal, and other characteristics as between the tire and a road surface on which the tire is traveling. While the shape and size of possible depressions in a tire surface may be essentially infinite, most tire treads have combinations of features that are commonly referred to as grooves and sipes. The tread contour surface 15 of the tread segment 11 has various projections that by way of example, are shown as ribs 16 and sipe blades 17 which would form grooves and sipes, respectively, in a tire produced using tread segment 11.

The tread segment 11 depicted in the drawings is a single integral piece of metal which, according to the preferred form of the present invention, may be a hardened steel. Alternatively, the material of the segmented mold 10 could be stainless steel which would further serve to improve corrosion and pitting resistance of the mold surfaces that is typically caused by electrolysis. Hardened steels are particularly advantageous for tire molds as compared with aluminum or other metals in terms of extended wear and resistance to damage, which may take place in the installing and removing of tire molds from a tire curing press and the transport and storage thereof.

The tread segment 11 may be initially formed from material having a substantially rectangular cross section. For purposes of reducing the extent of cutting required in the electric discharge machining operation described hereinafter, a plurality of stepped arcuate surfaces 20-30, as depicted in chain lines, may be milled circumferentially of the tread segment 11. As seen in FIGS. 1 and 2, the surfaces 20-30 are displaced a distance radially inwardly of the eventual mold configuration to result from the process according the present invention. For example, the surfaces 21, 25, and 29 are formed slightly radially inwardly of the ribs 16 to be formed therein. Similarly, surfaces 23 and 27 are formed slightly radially inwardly of the sipe blades 17 to be eventually formed in those locations. The extent to which a tread segment 11 can be milled to form step surfaces 20-30, if any, is, of course, dependent upon the tread configuration of a tire and, therefore, the mold construction. As thus prepared, the tread segment 11 is ready for mounting in electrical discharge machining apparatus for processing to the desired final configuration.

Figure 3:
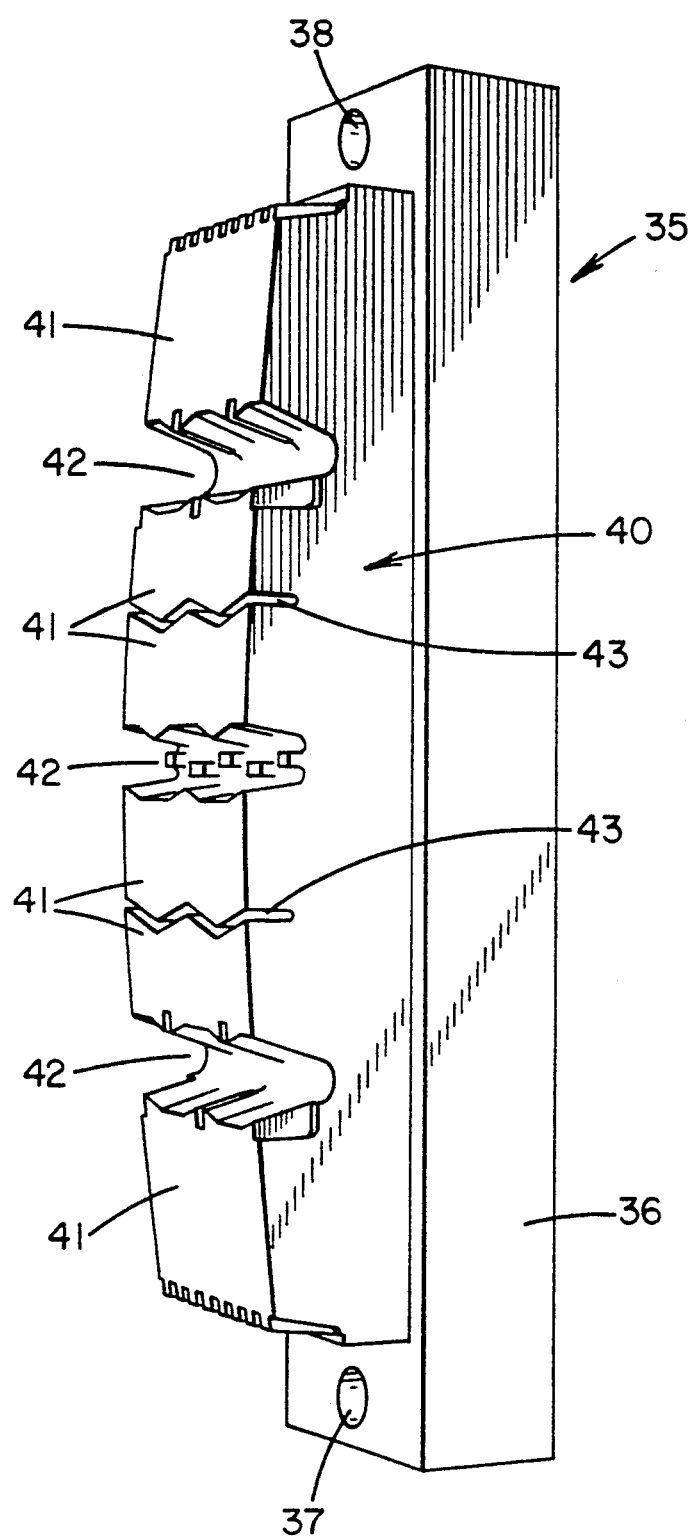
FIG. 3 is a perspective view of an exemplary carbon electrode for use in electric discharge machining apparatus for machining the finished portion of the fragmentary circumferential tread segment of FIG. 2 of the drawings.

An exemplary electrode, generally indicated by the numeral 35, is also prepared for use in the electric discharge molding apparatus to produce the configuration of tread segment 11 depicted in FIGS. 1 and 2 of the drawings. The electrode 35, as best seen in FIGS. 1 and 3, has a base 36, which is adapted as by fastener holes 37 and 38 for mounting to existing tool-holding apparatus on conventional electric discharge molding apparatus. As can be appreciated, particularly from FIGS. 1 and 2, the electrode 35 is of such a lateral dimension as to extend the entire lateral or axial extent of the tread segment 11 to insure absolute dimensional accuracy from shoulder to shoulder of the resultant tire and the precise placement of tread elements thereacross. The electrode 35 may be made of conventional carbon materials commonly employed for electric discharge molding.

As shown, the electrode 35 has a machining block 40 extending outwardly from base 36. The machining block 40 has an electrode tread contour surface 41 which is configured to form the tread contour surface 15 of the tread segment 11. The electrode tread contour surface 41 is interrupted by rib slots 42 and sipe blade slots 43. As can be appreciated by reference to FIG. 1, the electrode rib slots 42 and sipe blade slots 43 are appropriately relatively located to form the ribs 16 and sipe blades 17 of the tread segment 11. The rib slots 42 and sipe blade slots 43 are of greater dimensions than the ribs 16 and the sipe blades 17, although otherwise aligned therewith, as generally depicted in FIG. 1. This greater size is to allow the simultaneous discharge machining of the maximum number of ribs 16 and sipe blades 17 as discussed in greater detail hereinafter to compensate for an extent of overburn, which is characteristic of electric discharge molding, and to satisfy other considerations discussed hereinafter.

A knowledge of the spatial geometry of the desired tread pattern is necessary before the geometry of electrode 35 and the relative motion to effect formation and finishing of the desired tread pattern may be found. Such spatial geometry may be developed by generating a three-dimensional representation of the desired tread pattern. Tread patterns are specified customarily as a two-dimensional array of points, each of whose radii and vertical dimension from a preselected reference are furnished by the tread pattern designer. The three-dimensional representation may be generated by extrapolating from the nearest known points the radii and vertical dimensions for all intermediate points necessary to describe the pattern geometry. For example, where a rib having planar side surfaces and a smooth arcuate end is to be described in three dimensions, as best appreciated from the isometric projection of its model shown in FIG. 4, it will suffice to describe the points on both side surfaces at its base (37, 37') and the points at which the end arc begins (38, 38'), together with the points at which the arc is at its maximum extended dimension (39, 39').

The geometry of electrode 35 and the relative motion to effect formation and finishing of the desired tread pattern is found by first determining the "idealized" electrode geometry necessary to produce the desired tread mold geometry within acceptable dimensional tolerances for the smallest unit of the tread mold geometry, which may be called an "individual subsystem". In particular the idealized electrode geometry may be found by adjusting the dimension of each surface by a preselected, constant amount (which may be referred to as "slack"). In the present example, an initial slack of 0.020"(0.0508 cm) will be assumed to yield geometries of acceptable tolerance.

Whether to enlarge or reduce the dimension of each surface by the slack depends on the effect of electrode milling on that surface. Where electrode milling effects a greater reduction in surface dimensions than the nominal amount of the slack, which occurs with surfaces having a substantially radial orientation such as slots, the slack must be added to the premilled surface dimension to increase the same. Conversely, where electrode milling effects a smaller than nominal reduction in surface dimensions, which occurs with surfaces having a significant deviation from a radial orientation such as blade, the slack must be subtracted from the premilled surface dimension to reduce the same. Generally, the greater the angular deviation from a radial orientation, the greater the dimensional reduction produced by electrode milling.

Figure 11A:
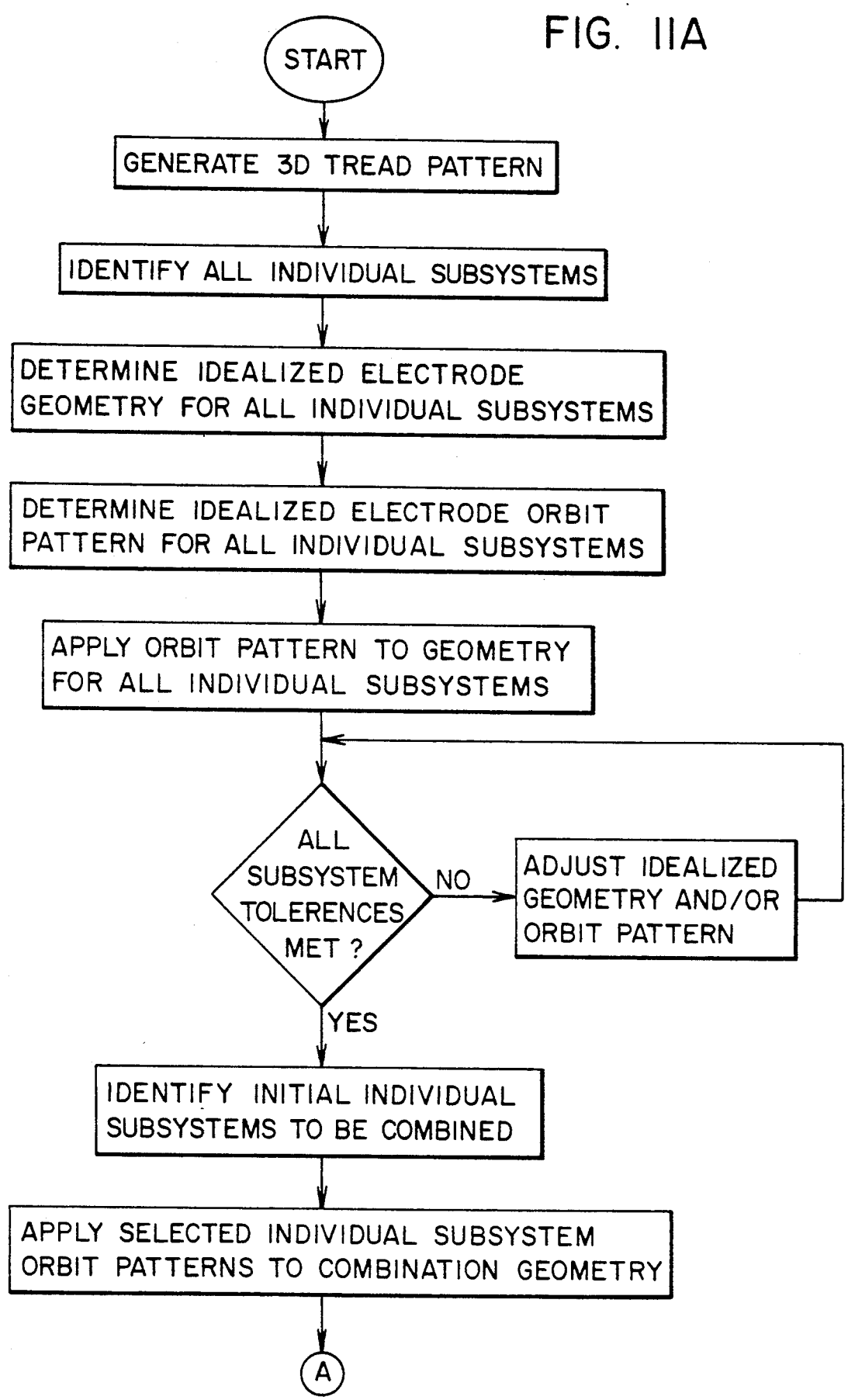
FIGS. 11A is a partial top level flow chart depicting an exemplary process in accordance with the present invention for determining the geometry of the electrode and the relative motion to effect formation and finishing of the desired tread pattern.

FIGS. 11A and 11B present a top level flow chart depicting an exemplary process sequence in accordance with the present invention for determining the geometry of the electrode and the relative motion to effect formation and finishing of the desired tread pattern, and may be referred to for convenience throughout the following description.

An exemplary subsystem, such as a single sipe blade 17, and a graphical depiction of the relative motion to effect formation and finishing of that individual subsystem, is illustrated in FIGS. 5 through 10. The surface dimension of each side wall of sipe blade slot 43 is enlarged by the magnitude of the slack. As best seen in FIGS. 5 and 6, electrode 35 and tread segment blank 11 into which stepped arcuate surface 23 is cut and from which sipe blade 17 is to be formed are brought together with sipe blade slot 43 at the desired perpendicularity to stepped arcuate surface 23 and advanced to the desired depth, thereby effecting machining of the stepped arcuate surface 23 blank material proximately surrounded by sipe blade slot 43 and leaving the partially machined sipe blade 17 positioned in sipe blade slot 43.

Next, as shown in FIG. 7, which presents a top sectional view of partially machined sipe blade 17 and sipe blade slot 43, electrode 35 and tread segment blank 11 are moved sequentially relative to each other in a rectangular orbit pattern as represented by the direction of the arrows labeled A, B, C, and D, thereby effecting machining of the walls of stepped arcuate surface 23 proximately surrounded by sipe blade slot 43 to dimensional tolerances and the desired surface finish thereof. FIGS. 8 and 9 depict in schematic section machining of two of the surfaces of sipe blade 17 as displacement occurs in the direction of arrows A and C, respectively.

After completion of the aforedescribed rectangular orbit machining pattern, electrode 35 and tread segment blank 11 are separated as illustrated in FIG. 10, leaving sipe blade 17 machined to the desired dimensional tolerances and surface finish.

Once the idealized electrode geometry has been determined for each individual subsystem, the relative motion between each individual subsystem and the electrode, which may be referred to hereinafter as the idealized individual orbit pattern, is determined. Initially the relative motion may be arbitrarily selected to be a simple, closed geometric pattern such as a circle, square, or rectangle, dependant upon the idealized electrode geometry for each individual subsystem. Circular relative motion geometries are generally preferred as the initial orbit pattern due to the common necessity for machining individual subsystems having curved surfaces, such as the rounded end of a blade.

For simplicity, in determining the idealized individual orbit pattern it may be preferable to perform all calculations and make all determinations as if only electrode 35 or tread segment blank 11 moves, and all motion is in discrete, two-dimensional increments, as depicted in FIGS. 5 through 10. Of course, the relative motion of the selected orbit pattern may, if desired, be made in three-dimensional increments.

The selected orbit pattern may be applied graphically (as depicted in FIGS. 6 through 10 and discussed hereinabove) or numerically to the idealized electrode geometry, and the resulting surface geometries of each individual subsystem are checked for violations of acceptable tolerances.

Should tolerance violations occur, there are three possible corrective actions that may meet the original tolerance specifications: alter the electrode geometry, alter the electrode orbit pattern, or alter some combination thereof. However, altering the electrode orbit pattern will result in some change to all individual subsystems, requiring extensive, perhaps endless recalculation. Instead, the idealized electrode geometry for the individual subsystem exhibiting the tolerance violation is then modified in such direction and magnitude as to eliminate the violation and meet the original tolerance specifications. Often such correction will need to be made where sides of projections do not fall parallel to the orbital motion of electrode 35 because different amounts of tread segment blank will require removal from different angular surfaces.

If a separate electrode 35 was made for each individual subsystem, the idealized electrode geometry and the idealized orbit pattern would enable the successful manufacture of mold 10 to the desired tolerances and finish specifications. However, the small dimensions of and large number of individual subsystems in even a small area of most tread patterns would make manufacturing extremely difficult and costly. Therefore it is highly desirable to maximize the number of individual subsystems and resultant tread area to be encompassed by a single electrode. But any combination of individual subsystems will result in significant modifications to each idealized orbit pattern, destroying the tolerance and finish specifications achieved by the idealized electrode geometries and orbit patterns. Thus, successful combination of individual subsystems requires determination of an optimized electrode geometry and orbit pattern for the greatest number of individual subsystems achievable.

An optimized electrode geometry and orbit pattern for a plurality of individual subsystems may be empirically determined by progressive combinations of the idealized electrode geometry and idealized orbit pattern for individual subsystems and readjustment of those geometries and orbit patterns. For example, two individual subsystems may be combined into a single electrode and the tread segment and resulting electrode graphically or numerically engaged in relative motion as described by the idealized orbit pattern of first one, then the other individual subsystem. Thereafter, as described above in the case of individual subsystems, the resulting surface geometries of each subsystem in the combined subsystem is checked for violations of acceptable tolerances.

Should tolerance violations occur, corrections may be made in a manner similar to that explained for individual subsystems, i.e., is some combination of electrode geometry and orbit pattern may be altered. Again, to minimize recalculation it is preferable to alter the electrode geometry for the combined subsystem in such direction and magnitude as to eliminate the violation and meet the original tolerance specifications.

Once all tolerance specifications are met, the combined subsystem may be treated as a new individual subsystem and combined with another adjacent individual subsystem in a similar manner. This process may be repeated until all desired individual subsystems have been combined without tolerance violations, the maximum desired electrode size has been reached, or there does not exist any possible surface geometry without tolerance violations, which may be presumed to be the case after a given number X of recalculations have failed to produce a combination without tolerance violations.

Several preferences may be employed when determining electrode geometry and orbit patterns that facilitate optimization. First, greatest accuracy may be achieved when the first individual subsystem to be combined is selected to be nearest the reference for the geometry of the mold. Inasmuch as the centerline CL of mold 10 (FIG. 2) is most commonly the reference from which all dimensions of the tread pattern are measured, the first individual subsystem to be combined is preferably selected from the individual subsystems closest to the centerline of the mold. Where an electrode is to be made for the manufacture of objects of other geometries or having other references, it may be desirable to similarly adjust selection of the first two adjacent individual subsystems to be combined.

Optimization of electrode geometry and orbit pattern is most readily achieved when those individual subsystems whose geometries are most likely to require modification during the above described process are given combination priority. In other words, combinations should focus primarily upon those subsystems whose geometries have the least tolerance to geometric or orbit pattern alterations. It should be evident that the greater the angular deviation from a radial orientation of an individual subsystem, the greater its tolerance for a given modification.

In the present example, slots have the greatest angular deviation from a radial orientation and, therefore, as electrode geometry is modified, will have greater dimensional variation than any other subsystem. Combinations in the present example should suffice if selection priority is given first to slots and then to blades, the individual subsystem evidencing the next greatest angular variation.

Once combination of the initial individual subsystems is complete, additional individual subsystems may be selected for combination, and subsequently combined, for example in a serpentine pattern back and forth, laterally proceeding therefrom to mold extremities furthest in distance from the reference. In the instance of a tire mold, combinations should proceed toward a sidewall.

It should also be appreciated that while for the reasons above-described it may be of interest to manufacture the largest size electrode possible, the electrode is preferably constrained to such overall size as to approximate an integer multiple of a naturally occurring geometry. However, an electrode whose size substantially equals that of an integer multiple of a naturally occurring geometry may produce unacceptable discontinuities at the mold interface between multiple mold segments. Adjusting electrode size to produce a small overlap has been found to substantially eliminate any such deleterious effects.

In the case pneumatic tires, tread design is commonly formed of a pattern of circumferentially reoccurring geometric elements, sometimes referred to as pitch elements. So, for example, an electrode whose circumferential extent proximates that of two pitch elements and is adjusted to produce the above-noted small overlap, may be found to produce a mold constituting a preferred form of the present invention (see FIG. 2).

Where an electrode size proximates that of a multiple of a naturally occurring geometry, individual subsystem combinations may proceed in the above-noted serpentine pattern substantially constrained within a single, naturally-occurring geometry until the furthest extremity is reached, whereupon combinations may similarly continue, selected in the closest naturally occurring geometry and proceed back toward the centerline or other reference.

In the aforedescribed example, cuts are repeatedly made by the electrode 35 circumferentially about a tread segment blank 11 (FIG. 2) until the entire radially inner surface of tread segment blank 11 is configured with the desired tread pattern. When the number of tread segment blanks 11 required to constitute the tread of a tire are completed, these are combined with a pair of sidewall sections, which may be produced by conventional machining techniques, to form a completed tire mold that may be installed in a conventional tire curing press to produce tires having the precise dimensions of the mold.

Inasmuch as the present invention is subject to variations, modifications, and changes in detail, some of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the art of making molds, e.g., a metal tire mold which has precise dimensional accuracy as to the overall tire dimensions and the dimensions of the tread elements.

I claim:

1. A process for making from a mold segment blank a metal tire mold having a tread contour surface corresponding to the outer circumference of a tire to be molded and having a plurality of finished projections on the tire tread contour surface having sides oriented substantially normal to the tire tread contour thereat, comprising the steps of, generating a three-dimensional representation of the tread contour surface and the finished projections, machining an electrode for electric discharge machining apparatus having slots of greater dimensions than the finished projections for forming initial projections of greater dimensions than the finished projections, mounting the electrode and the mold segment blank in the electric discharge machining apparatus, generating an electric discharge between the electrode and the mold segment blank, effecting relative motion between the electrode and the mold segment blank substantially radially of the mold segment blank for forming the initial projections, and relatively orbiting the electrode and the mold segment blank for bringing the initial projections to the orientation and configuration of the finished projections and effecting finishing on the surfaces thereof.

2. A process according to claim 1, wherein the step of relatively orbiting the electrode and the mold segment blank includes bringing the walls of the slots of the electrode sequentially into engagement with corresponding sides of the initial projections and machining to the configuration of the finished projections.

3. A process according to claim 2, wherein the step of relatively orbiting the electrode and the mold segment blank includes the formation of ribs and sipe blades.

4. A process according to claim 1, wherein the step of effecting relative motion between the electrode and a mold segment blank radially of the mold segment blank includes machining the initial projections to substantially the entire radial extent of the projections.

5. A process according to claim 1, wherein the step of relatively orbiting the electrode and the segment of the tire tread contour includes machining the sides of the projections to an orientation substantially normal to the tire tread contour surface.

6. A process according to claim 1 further comprising the step of converting the tread contour surface and projection dimensions from a two-dimensional array of points to the three-dimensional representation.

7. A process according to claim 1 further comprising the steps of machining the electrode to extend the entire axial dimension of the tread contour surface from shoulder to shoulder of the tire to be molded.

8. A process according to claim 1 further comprising the step of forming a plurality of stepped arcuate surfaces in the mold segment blank prior to mounting the mold segment blank in the electric discharge molding apparatus.

9. A process according to claim 8, wherein the step of forming a plurality of stepped arcuate surfaces includes the step of milling the arcuate surfaces to a depth radially inwardly of the depth of the initial projections to be formed thereat.

10. A process according to claim 1 further comprising the step of moving the electrode to a plurality of slightly overlapping positions circumferentially about the mold segment blank to establish a continuing pattern of the finished projections on the entirety of the tread contour surface.

11. A process for making from a mold blank a metal mold having a contoured surface corresponding to the outer surface of a product to be molded and having a plurality of finished projections on the contoured surface having sides extending from the contoured surface, comprising the steps of,
   generating a three-dimensional representation of the contoured surface and the finished projections,
   machining an electrode for electric discharge machining apparatus having slots of greater dimensions than the finished projections for forming initial projections of greater dimensions than the finished projections,
   mounting the electrode and the mold blank in the electric discharge machining apparatus,
   generating an electric discharge between the electrode and the mold blank,
   effecting relative motion between the electrode and the mold blank to achieve machining engagement therebetween for forming the initial projections, and
   relatively orbiting the electrode and the mold segment blank for machining the initial projections to the orientation and configuration of the finished projections and effecting finishing on the surfaces thereof.

12. A process according to claim 11 further comprising the step of relatively moving the electrode and the mold segment blank substantially radially of the mold segment blank for initially forming the projections prior to relatively orbiting the electrode and the mold segment blank.

13. A process according to claim 12, wherein the step of combining the electrode geometry for selected of the individual subsystems includes initially selecting adjacent individual subsystems located proximate the reference for the geometry of the mold.

14. A process according to claim 12, wherein the step of combining the electrode geometry for selected of the individual subsystems includes the step of initially selecting individual subsystems having the least tolerance to electrode geometry or orbit pattern alterations.

15. A process according to claim 12, wherein said step of generating a three-dimensional representation includes extrapolating from the nearest known points the radii and dimensions for all intermediate points necessary to define the geometries of the finished projections of the tire mold.

16. A process according to claim 12, wherein the step of determining an electrode geometry for the individual subsystems further comprises the step of adjusting the dimensions of each surface of the electrode geometry for the individual subsystems by a constant amount to yield geometries of acceptable tolerance.

17. A process according to claim 12, wherein the step of determining an orbit pattern for the individual subsystems includes the steps of initially selecting a simple geometric orbit pattern, applying the orbit pattern to the electrode geometry to check for violations in surface dimensional tolerances for the individual subsystem, and, if necessary, altering the electrode geometry, orbit pattern, or both to eliminate violations in surface dimensional tolerances.

18. A process according to claim 12, wherein the step of determining an orbit pattern for the combination of selected individual subsystems includes the steps of selecting a combined orbit pattern, applying the combined orbit pattern to the electrode geometry of the individual subsystems to check for violations in the surface dimensional tolerances for the individual subsystems, and, if necessary, altering the electrode geometry, combined orbit pattern, or both to eliminate violations in surface dimensional tolerances.

19. A process for making from a mold segment blank a metal tire mold having a tread contour surface corresponding to the outer circumference of a tire to be molded and having a plurality of finished projections on the tire tread contour surface having sides oriented substantially normal to the tire tread contour thereat and arranged in a plurality of individual subsystems having geometries that repeat over the outer circumference of the tire, comprising the steps of,
   generating a three-dimensional representation of the tread contour surface and the finished projections,
   determining an electrode geometry for the individual subsystems which when machined in an electrode for electric discharge machining apparatus forms the individual subsystems on the surfaces of the mold segment blank substantially within preselected surface dimensional tolerances for each individual subsystem,
   determining an orbit pattern for the individual subsystems in which the electrode and the mold blank are moved relative to each other during machining,
   combining the electrode geometry for selected of the individual subsystems into a combination electrode geometry,
   determining an electrode geometry for the combination of selected individual subsystems which when machined in the electrode for electric discharge machining apparatus forms the individual subsystems on the surfaces of the mold segment blank substantially within the preselected surface dimensional tolerances for each selected individual subsystem,
   determining an orbit pattern for the combination of selected individual subsystems with which the electrode and the mold blank are moved relative to each other during machining,
   machining an electrode having the electrode geometry determined for the combination of selected individual subsystems,
   mounting the electrode and the mold segment blank in the electric discharge machining apparatus,
   generating an electric discharge between the electrode and the mold segment blank, and
   relatively orbiting the electrode and the mold segment blank in said orbit pattern for said combination of selected individual subsystems for forming the finished projections and effecting finishing on the surfaces thereof substantially within said preselected surface dimensional tolerances for each individual subsystem.

20. A process for making an electrode for electric discharge machining of a mold segment blank into a metal tire mold having a tread contour surface corresponding to the outer circumference of a tire to be molded and having a plurality of finished projections on the tire tread contour surface arranged in a plurality of individual subsystems having geometries that repeat over the outer circumference of the tire, comprising the steps of, generating a three-dimensional representation of the tread contour surface and the finished projections, determining an electrode geometry for the individual subsystems which when machined in an electrode for electric discharge machining forms the individual subsystems on the surfaces of the mold segment blank substantially within preselected surface dimensional tolerances for each individual subsystem, determining an orbit pattern for the individual subsystems in which the electrode and the mold blank are moved relative to each other during machining, combining the electrode geometry for selected of the individual subsystems into a combination electrode geometry, determining an electrode geometry for the combination of selected individual subsystems which when machined in the electrode for electric discharge machining forms the individual subsystems on the surfaces of the mold segment blank substantially within the preselected surface dimensional tolerances for each selected individual subsystem, determining an orbit pattern for the combination of selected individual subsystems with which the electrode and the mold blank are moved relative to each other during machining, machining an electrode having the electrode geometry determined for the combination of selected individual subsystems, and relatively orbiting the electrode and the mold segment blank in the orbit pattern determined for the combination of selected individual subsystems for forming the finished projections and effecting finishing on the surfaces thereof substantially within the preselected surface dimensional tolerances for each individual subsystem.

\* \* \* \* \*